United States Patent
Kawabe et al.

(10) Patent No.: US 6,895,348 B2
(45) Date of Patent: May 17, 2005

(54) INFORMATION PLAYBACK APPARATUS WITH AN UNUSUAL WAVEFORM CIRCUIT

(75) Inventors: Akira Kawabe, Osaka (JP); Koichi Nagano, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 134 days.

(21) Appl. No.: 10/340,273

(22) Filed: Jan. 10, 2003

(65) Prior Publication Data

US 2003/0141997 A1 Jul. 31, 2003

(30) Foreign Application Priority Data

Jan. 29, 2002 (JP) .......................... 2002-020698

(51) Int. Cl.[7] .............................................. G11B 5/09
(52) U.S. Cl. ...................... 702/66; 702/69; 702/70; 702/78; 702/79
(58) Field of Search ................ 702/66, 69, 70, 702/78, 79; 369/47.51–47.55, 44.26, 44.35, 53.21, 53.31, 124.02, 124.09, 275.1; 341/132; 360/31, 32, 39, 48, 77.13

(56) References Cited

U.S. PATENT DOCUMENTS

| | | | | |
|---|---|---|---|---|
| 5,093,750 A | * | 3/1992 | Park et al. ................ 386/98 |
| 5,663,941 A | * | 9/1997 | Aoshima ................ 369/44.34 |
| 5,737,306 A | * | 4/1998 | Ito et al. ................ 369/275.1 |
| 5,841,751 A | * | 11/1998 | Komazaki et al. ........ 369/53.33 |
| 5,875,156 A | * | 2/1999 | Ito et al. ................ 369/30.1 |
| 6,188,384 B1 | * | 2/2001 | Sullivan et al. .......... 345/440.1 |
| 6,469,965 B1 | * | 10/2002 | Horita ................ 369/53.2 |
| 6,560,053 B1 | * | 5/2003 | Ohta et al. ................ 360/51 |
| 6,597,650 B2 | * | 7/2003 | Katakura et al. ........ 369/59.22 |
| 2002/0036963 A1 | * | 3/2002 | Shimoda ................ 369/47.53 |
| 2002/0180737 A1 | * | 12/2002 | Letts ................ 345/440.1 |
| 2003/0072234 A1 | * | 4/2003 | Ueki ................ 369/47.53 |

* cited by examiner

Primary Examiner—Carol S. W. Tsai
(74) Attorney, Agent, or Firm—RatnerPrestia (57) ABSTRACT

An unusual waveform detection circuit is a digital-type unusual waveform detection circuit that arbitrarily sets a threshold used for determining an unusual waveform and produces an unusual waveform determination signal by comparing an input signal with the threshold. In producing the unusual waveform determination signal, one of a configuration where a voltage at each of all sampling points is compared with a reference voltage and a configuration where a continuously changing gradient of signal waveform peaks is calculated and is compared with a reference gradient is selectively employed. The unusual waveform detection circuit can easily and accurately detect various unusual waveforms.

12 Claims, 8 Drawing Sheets

• Sampling point

• Sampling point

INFORMATION PLAYBACK APPARATUS WITH AN UNUSUAL WAVEFORM CIRCUIT

FIELD OF THE INVENTION

The present invention relates to an unusual waveform detection circuit for minimizing an adverse effect on subsequent signal processing by detecting unusualness of a playback waveform due to a recording pit defect in a recording medium such as an optical disc or a magnetic disc or displacement of a recording pit reader.

BACKGROUND OF THE INVENTION

Figure 12:
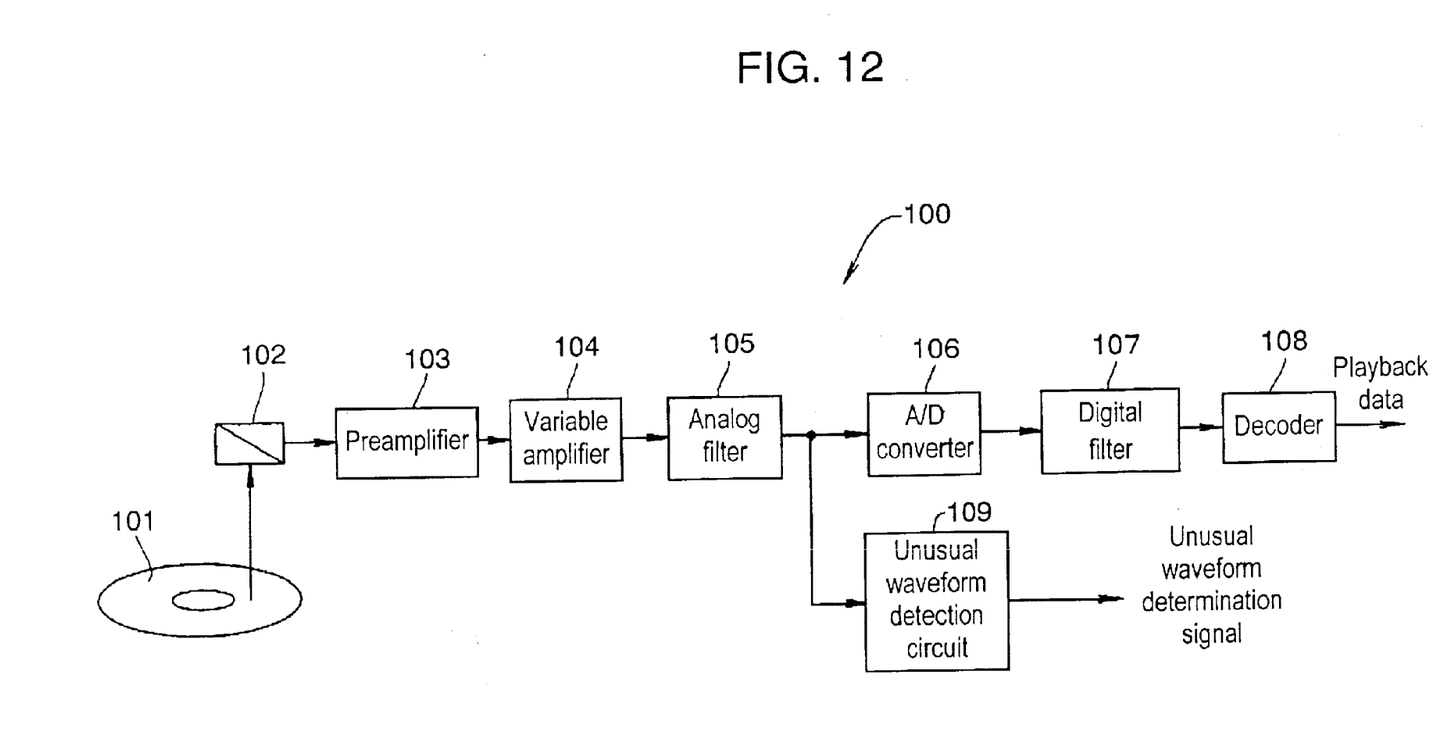
FIG. 12 is a block diagram showing a configuration of a processing circuit system of a playback signal in a conventional optical disc device.

An unusual waveform detection circuit, one of defect detecting circuits in a conventional optical disc, is illustrated in FIG. 12, together with a processing circuit system of a playback signal of an information playback apparatus.

In FIG. 12, playback signal processing circuit 100 in an optical disc includes optical pickup 102 for reading a recorded signal from recording medium 101, preamplifier 103 for pre-amplifying an output signal from optical pickup 102, variable gain amplifier 104 for further amplifying and adjusting an output signal from preamplifier 103, analog filter 105 for filtering an output signal from variable gain amplifier 104, analog/digital (A/D) converter 106 for converting an output signal from analog filter 105 from analog to digital, digital filter 107 for filtering an output signal from A/D converter 106, decoder 108 for decoding an output signal from digital filter 107 and outputting playback data, and analog-type unusual waveform detection circuit 109 for detecting unusualness of an output signal waveform from analog filter 105.

Figure 13:
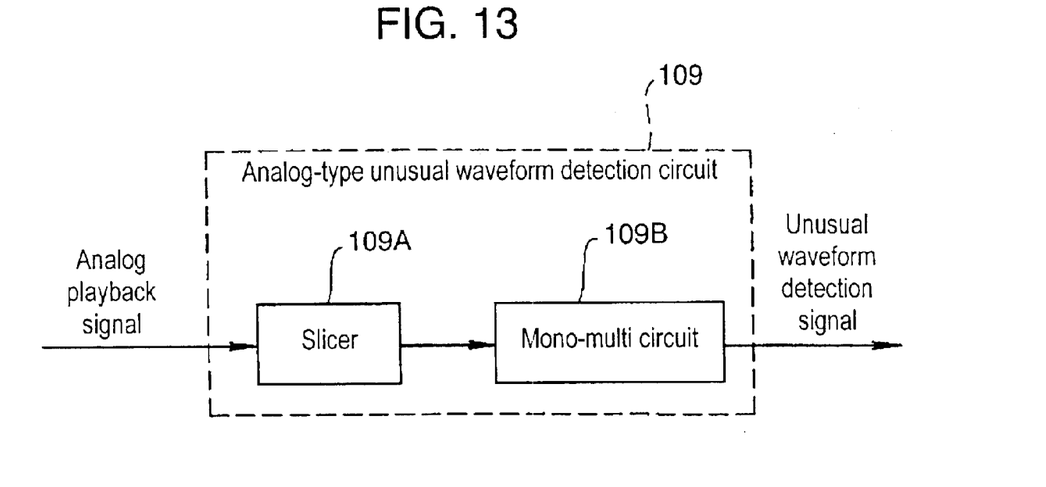
FIG. 13 is a block diagram showing a configuration of the unusual waveform detection circuit of FIG. 12.
Figure 14:
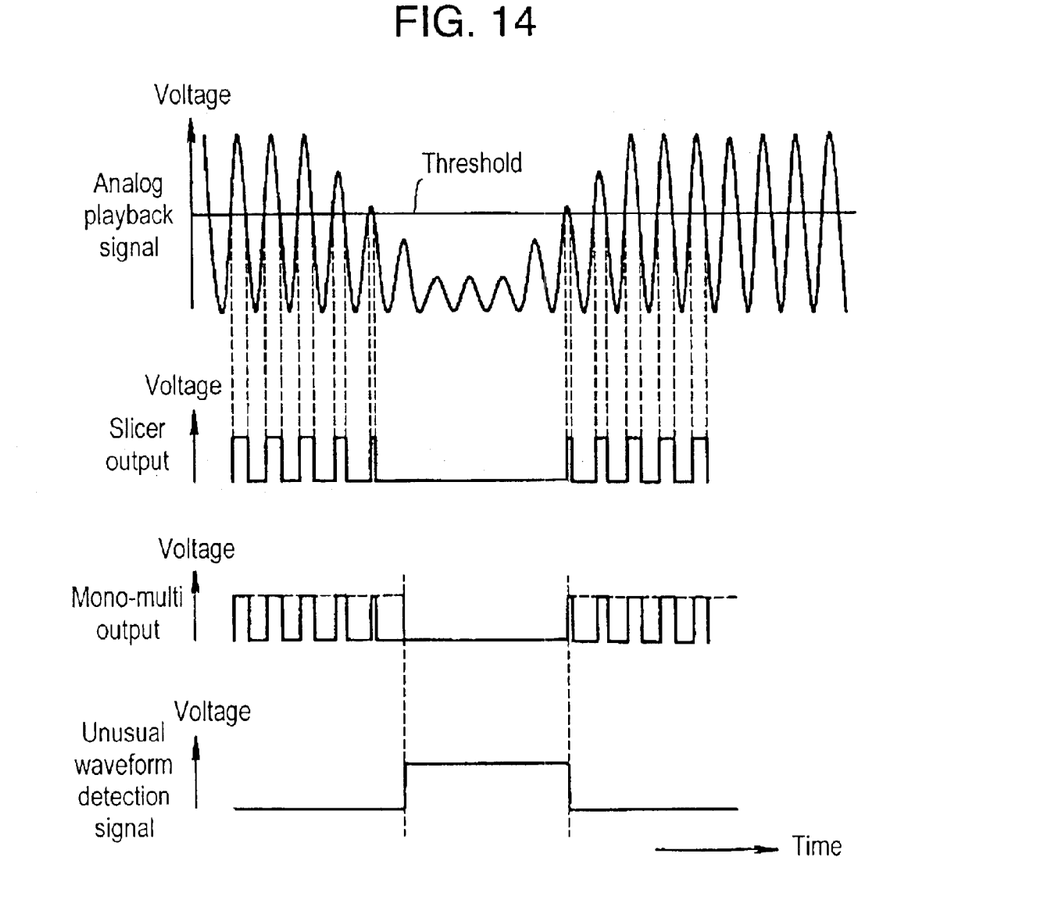
FIG. 14 is a timing chart showing an operation of the unusual waveform detection circuit of FIG. 13.

Unusual waveform detection circuit 109, as shown in FIG. 13 and FIG. 14, has slicer 109A for binarizing an analog playback signal with reference to a predetermined threshold, and mono-multi circuit 109B for producing an unusual waveform detection signal based on the binarized signal.

An operation of these elements is schematically described hereinafter.

Generally, when information is stored in an optical disc such as a CD (compact disc) or DVD (digital versatile disc) or the information is played back from the optical disc, the following procedure is used. Analog information such as video or music is encoded to digital data, then modulated, and written into an information-by-information pit on recording medium 101 such as the optical disc.

In playing back the data, the pit that is recording the data is firstly scanned with a laser. Optical pickup 102 takes in laser reflected beam from recording medium 101 and converts intensity of the reflected beam to an electric signal to provide an analog playback signal. The analog playback signal provided by optical pickup 102 is pre-amplified by preamplifier 103, and then adjusted in amplitude by variable gain amplifier 104.

Then, analog filter 105 boosts a high frequency component of the playback signal for waveform equalization. A/D converter 106 digitizes the analog playback signal having passed through analog filter 105. A digital filtering process is performed after this process by A/D converter 106. In other words, the digitized data is corrected by digital filter 107 and decoded by decoder 108, and decoder 108 outputs the binary digital playback data that is stored in the pit.

In analog-type unusual waveform detection circuit 109, as shown in FIG. 13 and FIG. 14, slicer 109A binarizes voltage of the analog playback signal having passed through analog filter 105 with reference to the preset threshold voltage (slicer output in FIG. 14). Mono-multi circuit 109B then receives the binarized signal and produces an unusual waveform detection signal.

In decoding the data recorded in the recording medium such as the optical disc, waveform unusualness of the playback signal due to a defect of the recording pit in the optical disc causes wrong operation of a subsequent signal processing circuit. Therefore, the unusual waveform signal must be detected in a recording and reproducing system. The analog-type unusual waveform detection circuit for detecting an unusual waveform signal using an analog playback signal is presently wide used. However, the analog type detecting circuit cannot sometimes easily and accurately detect the unusual waveform signal because the circuit is adversely affected by a broadband analog playback signal and noise. The analog type detecting circuit also requires an external component and must be large in scale.

SUMMARY OF THE INVENTION

A digital-type unusual waveform detection circuit detects an unusual waveform of an analog playback signal. This digital-type unusual waveform detection circuit comprises a digitizing unit for performing analog/digital conversion of the analog playback signal, a detecting unit for determining whether or not an input signal from the digitizing unit satisfies a preset input waveform condition and outputting a determination signal, and a counting unit for counting the output from the detecting unit and outputting an unusualness detection signal when the count value exceeds a predetermined threshold.

DESCRIPTION OF THE PREFERRED EMBODIMENTS

Unusual waveform detection circuits used for a processing circuit system of a playback signal in an information playback apparatus in accordance with exemplary embodiments 1 to 9 of the present invention will be described hereinafter with reference to the accompanying drawings.

(Exemplary Embodiment 1)

Figure 1:
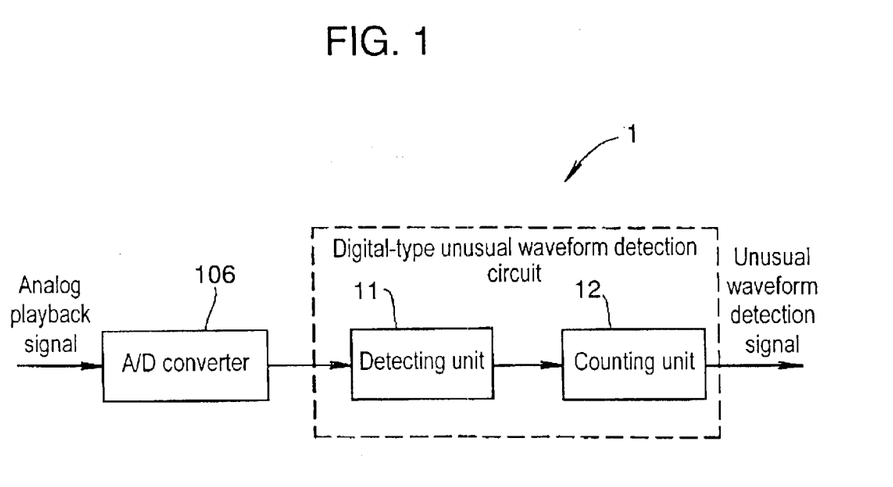
FIG. 1 is a block diagram showing a basic configuration of an unusual waveform detection circuit in accordance with exemplary embodiment 1 of the present invention.

FIG. 1 is a block diagram showing an essential configuration of an unusual waveform detection circuit in accordance with exemplary embodiment 1 of the present invention. In FIG. 1, elements similar to those in FIG. 12 are denoted with the same reference numbers, and the descriptions of those elements are omitted.

Figure 3:
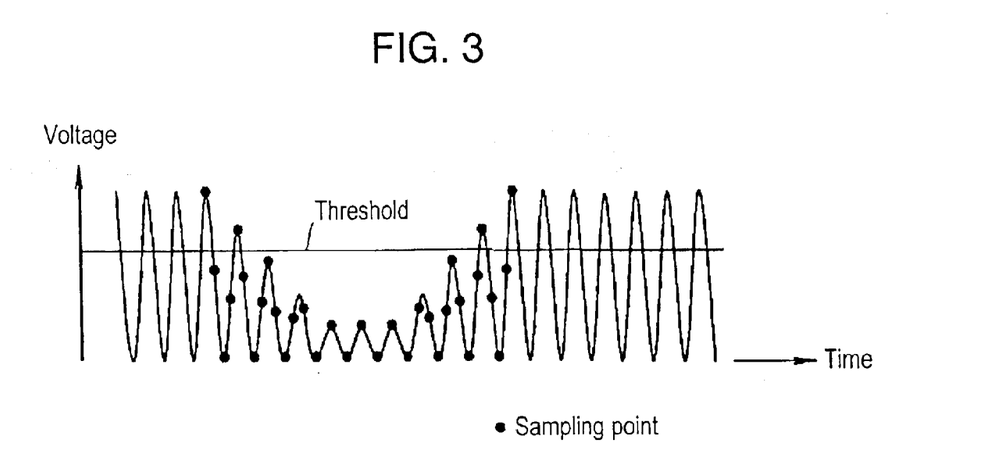
FIG. 3 shows an analog playback signal and an example of unusual waveform determination based on all sampling points in exemplary embodiment 1.

In FIG. 1, unusual waveform detection circuit 1 includes detecting unit 11 for producing an unusual waveform determination signal from an input digital playback signal and counting unit 12 for producing an unusual waveform detection signal from the input unusual waveform determination signal. Unusual waveform detection circuit 1 also detects in a digital mode whether or not a cyclic analog playback signal from an optical disc has an unusual waveform. As shown in FIG. 3 later, there are two types of unusual waveforms: one type where the upper part of the signal waveform of the analog playback signal lowers over time, and the other type where the lower part of the signal waveform rises.

Figure 2:
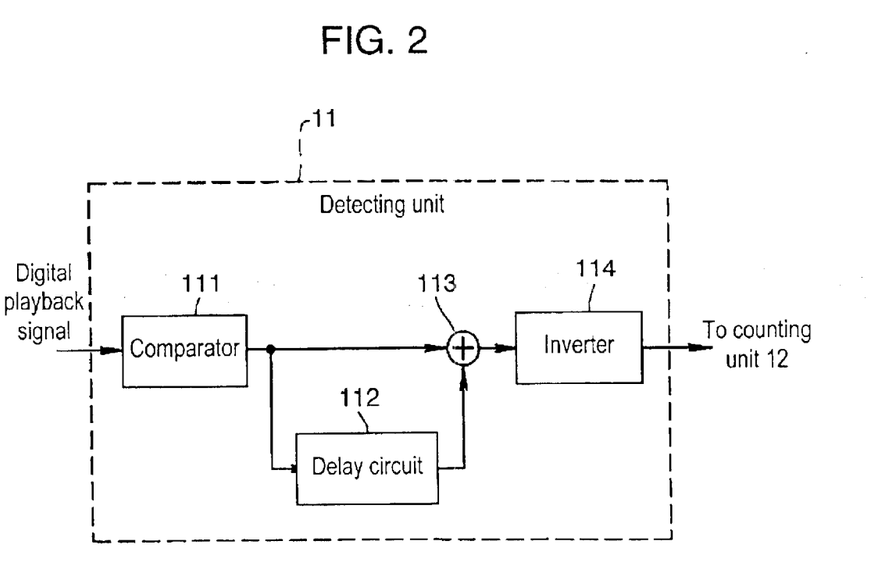
FIG. 2 is a block diagram showing an essential configuration of a detecting unit of the unusual waveform detection circuit of FIG. 1.

Detecting unit 11, as shown in FIG. 2, includes comparator 111, delay circuit 112, adder 113, and inverter 114, receives the digitized playback signal, determines whether or not the received signal satisfies a preset input waveform condition, and hence determines whether or not the received signal has an unusual waveform.

As this input waveform condition, a condition that respective voltages at sampling points of the input digital playback signal go out of a reference range of the preset threshold voltage continuously at a plurality of times or more (here, the voltage exceeds the preset threshold voltage) is used.

When the signal waveform is usual, respective voltages at the sampling points of the input digital playback signal alternately and repeatedly exceed and do not exceed the threshold voltage every predetermined number of sampling points. When the signal waveform is unusual and lowers over time (FIG. 3), however, the voltages at the sampling points of the input digital playback signal are continuously below the threshold voltage. When the signal waveform is unusual and rises over time, the voltages at the sampling points of the input digital playback signal continuously are above the threshold voltage.

Comparator 111 compares a voltage at each sampling point of the digital playback signal supplied from A/D converter 106, namely a digitizing unit for A/D converting the analog playback signal, with the preset threshold voltage. Comparator 111 outputs "0" as a sign bit when the voltage of the digital playback signal exceeds the threshold voltage (the difference is positive), and outputs "1" as the sign bit when the voltage of the digital playback signal does not exceed the threshold voltage (the difference is negative). In other words, when the voltage of the input digital playback signal exceeds the threshold voltage, namely, when the signal waveform lowers or rises over time, comparator 111 outputs "0" as the sign bit.

Delay circuit 112 delays the output signal from comparator 111 by a predetermined time. This predetermined time corresponds to a half cycle of the analog playback signal, for example.

Adder 113 adds both outputs from comparator 111 and delay circuit 112. When the waveform is unusual, adder 113 outputs sign data "0" because both input signals are "0". When the waveform is usual, adder 113 outputs sign data "1" because both input signals are "1". Even when only one of both input signals becomes "0" within a delay time, adder 113 outputs sign data "1" and the waveform is determined to be usual when the other is "1". When the same sign data "0" continues continuously beyond the delay time, adder 113 outputs sign data "0" and the waveform is determined to be unusual.

Another operation of comparator 111 and adder 113 is described. Comparator 111 is configured to compare a voltage at each sampling point of the digital playback signal with the preset threshold voltage and to alternately output signals "0" and signals "1" every predetermined number of signals when the signal waveform is usual. In this configuration, when the signal waveform is unusual comparator 111 outputs either signals "0" or signals "1". In this case, adder 113 must be used as a subtracting circuit. When the same signs ("0" or "1") are continuously outputted from comparator 111, adder 113 outputs signal "0". When the signal waveform is unusual, the same signs ("0" or "1") are continuously outputted. When signal waveform is usual, namely when different signs are outputted every half cycle of the delay time, adder 113 outputs signal "1".

Inverter 114 outputs a signal provided by inverting the output signal from adder 113. Inverter 114 outputs, as an unusual waveform determination signal, sign data "1" inverted from "0" when the waveform is unusual for example, and outputs, as an usual waveform determination signal, sign data "0" inverted from "1" when the waveform is usual.

Counting unit 12 receives the unusual waveform determination signal from inverter 114, counts number of clocks continuously having unusual waveform determination signal "1" (measures elapsed time), and outputs an unusual waveform detection signal when the count number exceeds a predetermined threshold.

An operation of detecting unit 11 is then described.

FIG. 3 shows an analog playback signal and an example of unusual waveform determination based on all sampling points in exemplary embodiment 1. Deformation of the waveform by an unusual signal is divided into two types: one type where the upper part of the waveform lowers over time, and the other type where the lower part of the signal waveform rises. FIG. 3 shows the type where the upper part of the waveform lowers. Black circles in FIG. 3 show sampling points, and a vertical coordinate of each sampling point indicates a voltage of the digital playback signal.

As shown in FIG. 2 and FIG. 3, comparator 111 calculates a difference between a voltage of the digital playback signal at each sampling point and the preset threshold voltage, and outputs a sign bit corresponding to the difference. Comparator 111 outputs signal "0" when the difference is positive and outputs signal "1" when the difference is negative. The difference between the voltage at each sampling point and the preset threshold voltage is thus calculated. When an unusual waveform signal as shown in FIG. 3 exists, the voltages at sampling points are below the preset threshold voltage.

Adder 113 then adds an output sign bit ("0" or "1") from comparator 111 and an output sign bit delayed by delay circuit 112. When the same sign continues continuously, adder 113 outputs signal "0".

Inverter 114 then inverts output signal "0" supplied from adder 113 to provide signal "1", and outputs signal "1" as an unusual waveform determination signal to subsequent counting unit 12.

(Exemplary Embodiment 2)

Figure 4:
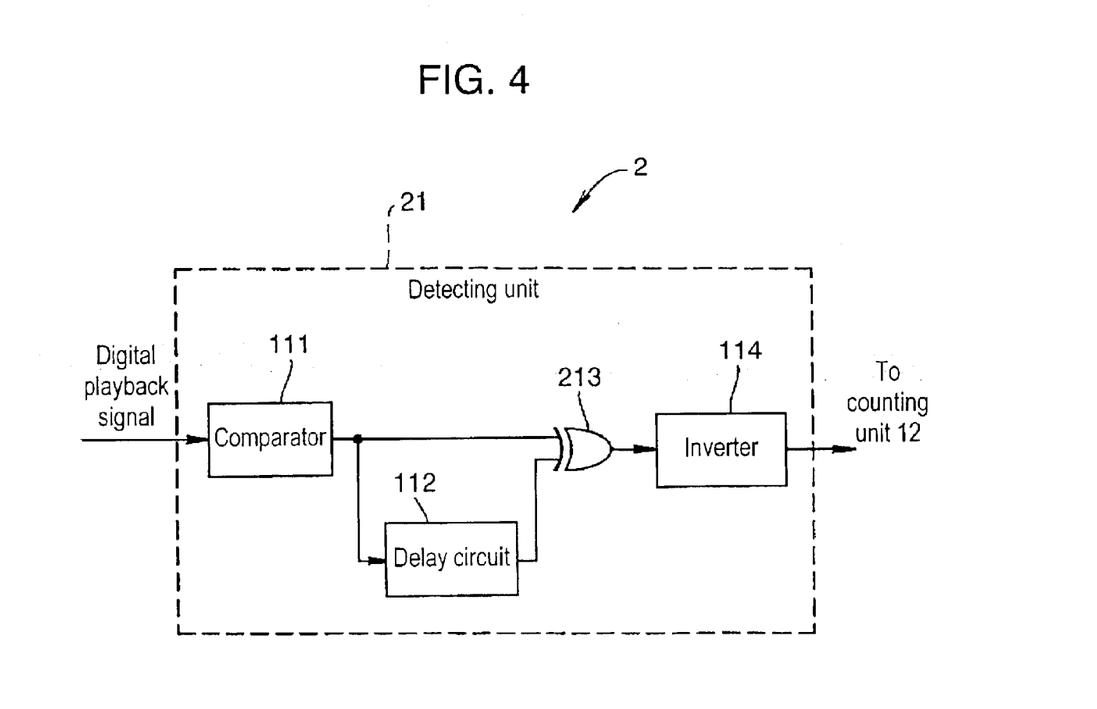
FIG. 4 is a block diagram showing an essential configuration of a detecting unit of an unusual waveform detection circuit in accordance with exemplary embodiment 2 of the present invention.

FIG. 4 is a block diagram showing an essential configuration of a detecting unit of an unusual waveform detection circuit in accordance with exemplary embodiment 2 of the present invention. In FIG. 4, elements similar to those in FIG. 1 and FIG. 2 are denoted with the same reference numbers, and the descriptions of those elements are omitted.

In FIG. 4, unusual waveform detection circuit 2 includes detecting unit 21 for producing an unusual waveform determination signal from an input digital playback signal and counting unit 12 for producing an unusual waveform detection signal from the input unusual waveform determination signal. Unusual waveform detection circuit 2 also detects whether or not an analog playback signal supplied from an optical disc has an unusual waveform.

Detecting unit 21 includes comparator 111, delay circuit 112, exclusive OR circuit 213 as a coincidence circuit, and inverter 114. Detecting unit 21 differs from detecting unit 11 of FIG. 2 in that detecting unit 21 employs exclusive OR circuit 213 instead of adding unit 113 of detecting unit 11.

Exclusive OR circuit 213 outputs "0" when both input signals have the same sign continuously and outputs "1" when both input signals have different sign continuously.

An operation of this configuration is similar to that of embodiment 1. However, an exclusive OR between a sign bit output from comparator 111 and a sign bit output delayed by delay circuit 112 is calculated in embodiment 2, and exclusive OR circuit 213 outputs "0" when the same sign continues. Inverter 114 inverts an output signal supplied from exclusive OR circuit 213 to provide "1", and can output an unusual waveform determination signal to subsequent counting unit 12.

(Exemplary Embodiment 3)

Figure 5:
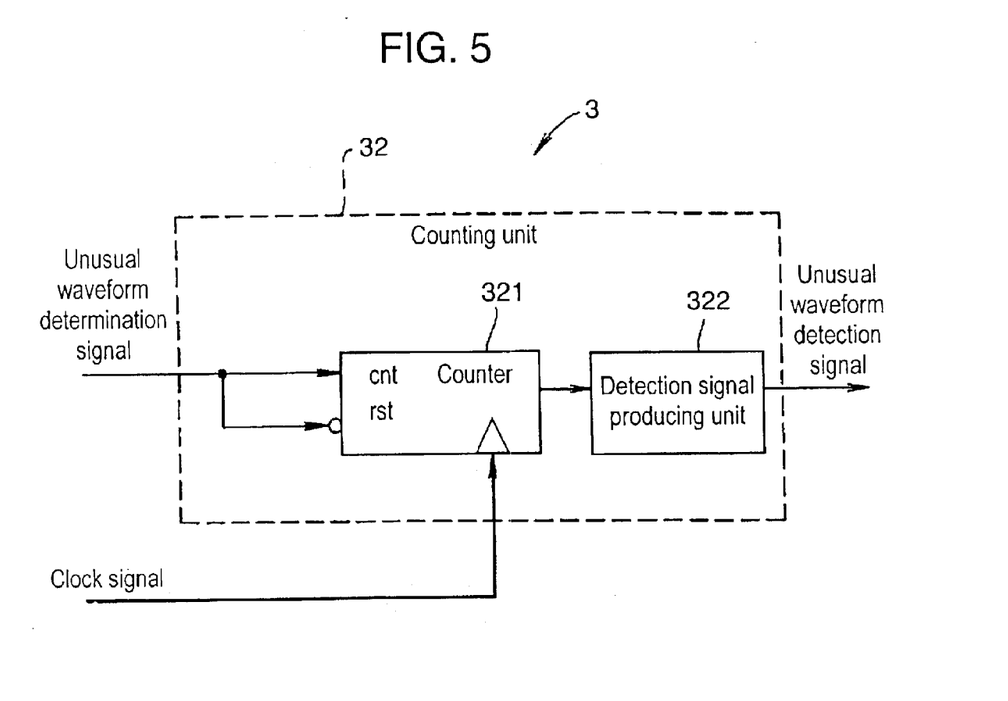
FIG. 5 is a block diagram showing an essential configuration of a counting unit of an unusual waveform detection circuit in accordance with exemplary embodiment 3 of the present invention.

FIG. 5 is a block diagram showing an essential configuration of a counting unit of an unusual waveform detection circuit in accordance with exemplary embodiment 3 of the present invention. In FIG. 5, elements similar to those in FIG. 1 and FIG. 2 are denoted with the same reference numbers, and the descriptions of those elements are omitted.

In FIG. 5, unusual waveform detection circuit 3 includes detecting unit 21 (or detecting unit 11) for producing an unusual waveform determination signal from an input digital playback signal and counting unit 32 for producing an unusual waveform detection signal from the input unusual waveform determination signal. Unusual waveform detection circuit 3 also detects whether or not an analog playback signal from an optical disc has an unusual waveform.

Counting unit 32 has counter 321 for counting elapsed time of the unusual waveform determination signal and detection signal producing unit 322 for producing an unusual waveform detection signal when the counted elapsed time is a reference value or more.

Counter 321 includes a set terminal and a reset terminal that receive the unusual waveform determination signal from detecting unit 21 (or detecting unit 11) and a clock terminal for receiving a clock signal for a counter. Counter 321 counts the elapsed time synchronously with the clock signal for the input counter when the input unusual waveform determination signal is "1", and is reset when the input unusual waveform determination signal is "0". Usual system clock is used as the clock signal for the counter.

Detection signal producing unit 322 compares count values of counter 321 with a preset counting threshold, and outputs the unusual waveform detection signal as a high level voltage only while the count values of counter 321 exceed the preset counting threshold.

In the configuration discussed above, counter 321 counts periods when the input unusual waveform determination signal is "1" synchronously with the clock signal for the input counter, is reset when the input unusual waveform determination signal is "0", and outputs a counting result.

Detection signal producing unit 322 then receives the counting result. When the count value by counter 321 exceeds the preset counting threshold, detection signal producing unit 322 determines that the waveform is unusual and outputs the unusual waveform detection signal as a high level voltage only while the count values exceed the preset counting threshold.

(Exemplary Embodiment 4)

Figure 6:
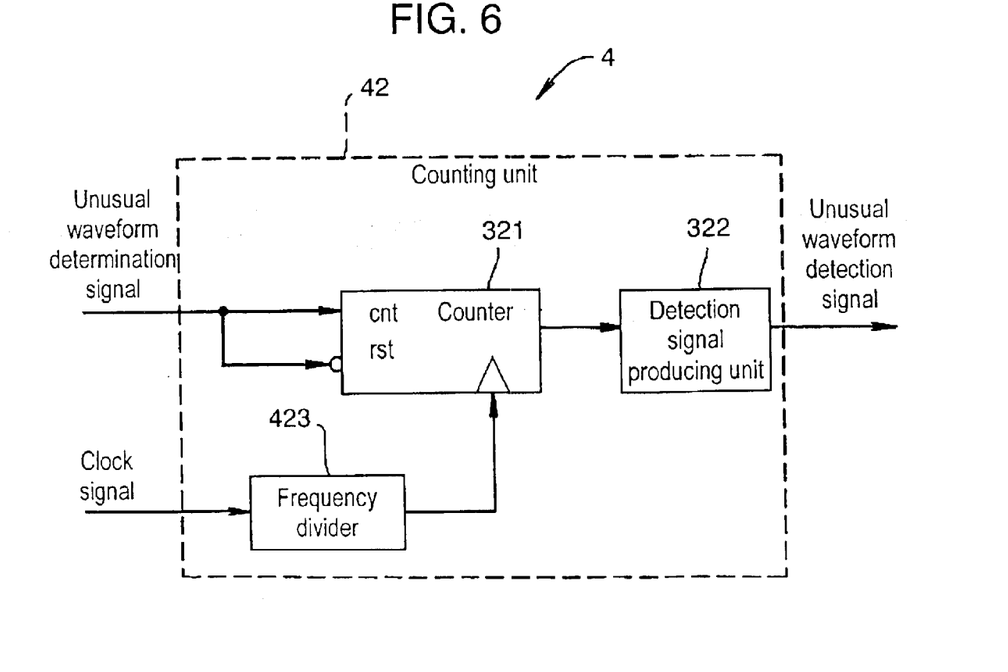
FIG. 6 is a block diagram showing an essential configuration of a counting unit of an unusual waveform detection circuit in accordance with exemplary embodiment 4 of the present invention.

FIG. 6 is a block diagram showing an essential configuration of a counting unit of an unusual waveform detection circuit in accordance with exemplary embodiment 4 of the present invention. In FIG. 6, elements similar to those in FIG. 5 are denoted with the same reference numbers, and the descriptions of those elements are omitted.

In FIG. 6, unusual waveform detection circuit 4 includes detecting unit 21 (or detecting unit 11) for producing an unusual waveform determination signal from an input digital playback signal and counting unit 42 for producing an unusual waveform detection signal from the input unusual waveform determination signal. Unusual waveform detection circuit 4 also detects whether or not an analog playback signal supplied from an optical disc has an unusual waveform.

Counting unit 42 has counter 321, detection signal producing unit 322, and frequency divider 423. Embodiment 4 differs from embodiment 3 in that frequency divider 423 for arbitrarily dividing a clock signal for a counter, namely an enabling signal of counter 321, is added.

An output terminal of frequency divider 423 is connected to the clock terminal of counter 321 in the configuration discussed above, so that frequency divider 423 arbitrarily divides the system clock signal, namely the enabling signal of counter 321, thereby suppressing counter resetting probability due to noise in the inputted playback signal.

(Exemplary Embodiment 5)

Figure 7:
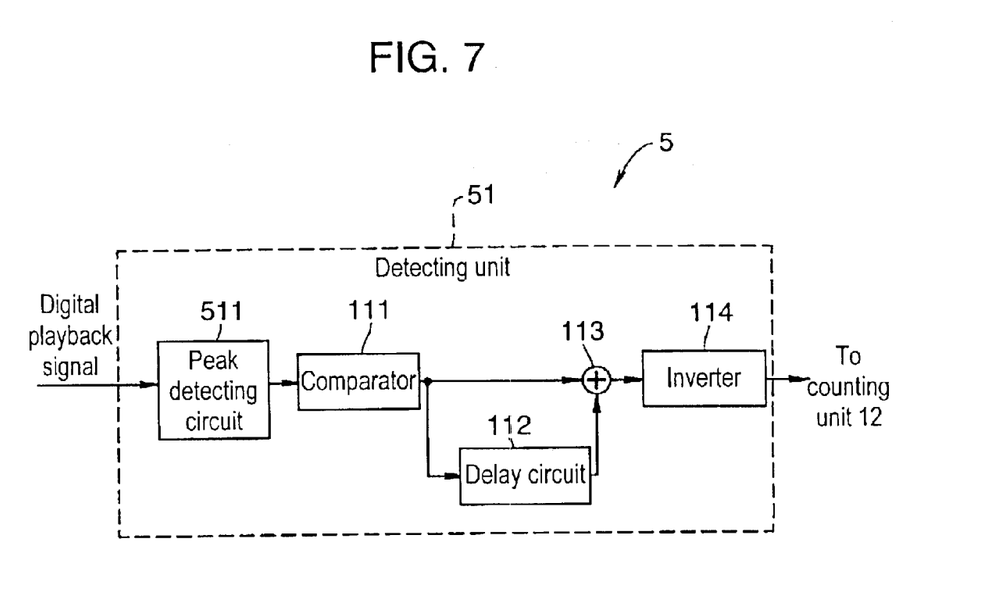
FIG. 7 is a block diagram showing an essential configuration of a detecting unit of an unusual waveform detection circuit in accordance with exemplary embodiment 5 of the present invention.

FIG. 7 is a block diagram showing an essential configuration of a detecting unit of an unusual waveform detection circuit in accordance with exemplary embodiment 5 of the present invention. In FIG. 7, elements similar to those in FIG. 1 and FIG. 2 are denoted with the same reference numbers, and the descriptions of those elements are omitted.

In FIG. 7, unusual waveform detection circuit 5 includes detecting unit 51 for producing an unusual waveform determination signal from an input digital playback signal and counting unit 12 (counting unit 32 or 42) for producing an unusual waveform detection signal from the input unusual waveform determination signal. Unusual waveform detection circuit 5 also detects whether or not an analog playback signal supplied from an optical disc has an unusual waveform.

Detecting unit 51 includes peak detecting circuit 511 as a peak detecting unit, comparator 111, delay circuit 112, adder 113, and inverter 114. Detecting unit 51 compares a peak voltage supplied from peak detecting circuit 511 with a preset threshold voltage, and determines whether or not the waveform is unusual. Comparator 111, delay circuit 112, adder 113, and inverter 114 constitute a first determining unit of embodiment 5, and the first determining unit compares a peak voltage from peak detecting circuit 511 with the preset threshold voltage, and determines whether or not the waveform is unusual.

Detecting unit 51 differs from detecting unit 11 of FIG. 2 in that detecting unit 51 has peak detecting circuit 511 before comparator 111, and does not perform the threshold determination based on all sampling points, but compares only peak voltage information at waveform peaks, namely at less number of sampling points, with the threshold voltage.

Peak detecting circuit 511 detects a waveform peak of the input digital playback signal and outputs a peak voltage of the waveform peak.

An operation of detecting unit 51 is described.

Figure 8:
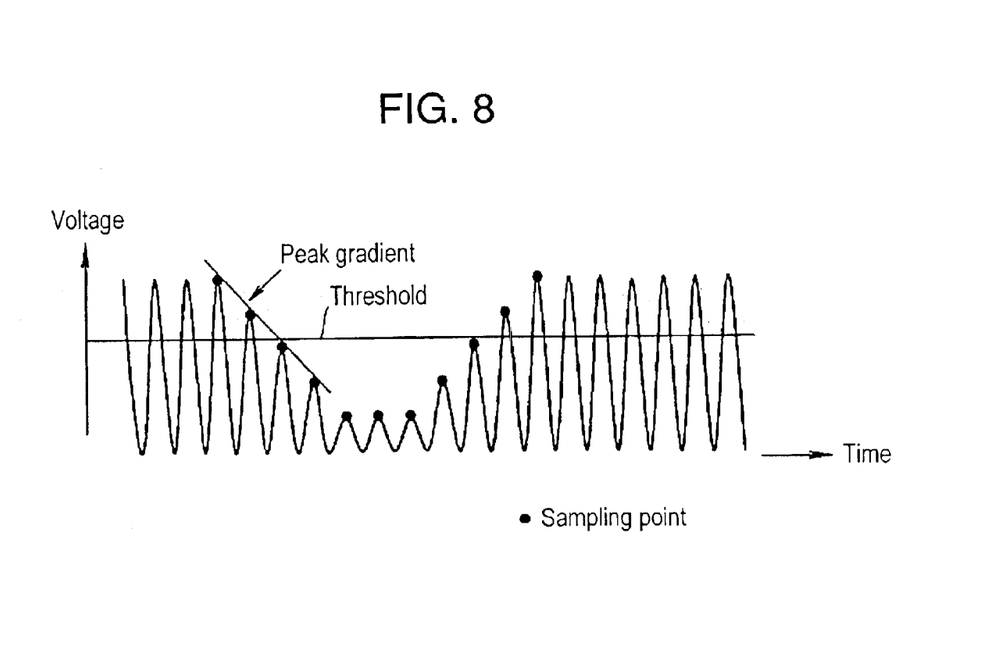
FIG. 8 shows an analog playback signal and an example of unusual waveform determination using peak information based on sampling points at a peak period in exemplary embodiment 5.

FIG. 8 shows an analog playback signal and an example of unusual waveform determination using only peak voltage information at sampling points in a peak period of a waveform in exemplary embodiment 5.

As shown in FIG. 7 and FIG. 8, firstly, peak detecting unit 511 receives a digital playback signal, detects a waveform peak of the digital playback signal, and outputs the peak voltage.

Comparator 111 then compares the peak voltage from peak detecting circuit 511 with the preset threshold voltage, and outputs a sign bit similarly to embodiment 1.

Adder 113 then adds the output sign bit from comparator 111 and an output sign bit delayed by delay circuit 112. When the same sign continues continuously, adder 113 outputs signal "0" similarly to embodiment 1.

Inverter 114 then inverts an output signal supplied from adder 113 to provide "1", and outputs the input unusual waveform determination signal to subsequent counting unit 12. In other words, inverter 114 outputs the unusual waveform determination signal when the same sign continues continuously for a predetermined period or longer.

(Exemplary Embodiment 6)

Figure 9:
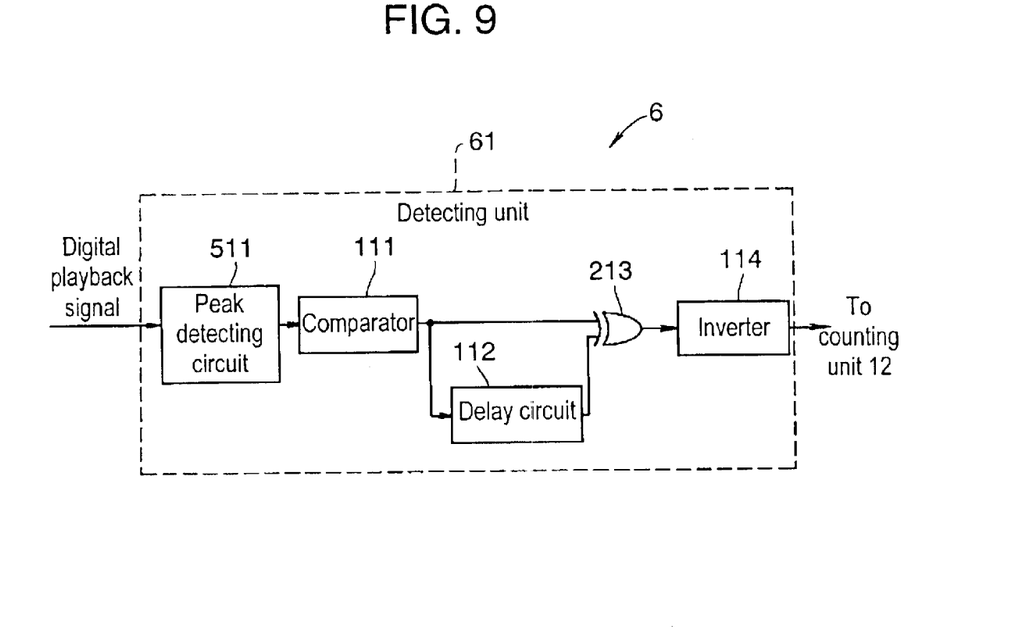
FIG. 9 is a block diagram showing an essential configuration of a detecting unit of an unusual waveform detection circuit in accordance with exemplary embodiment 6 of the present invention.

FIG. 9 is a block diagram showing an essential configuration of a detecting unit of an unusual waveform detection circuit in accordance with exemplary embodiment 6 of the present invention. In FIG. 9, elements similar to those in FIG. 7 are denoted with the same reference numbers, and the descriptions of those elements are omitted.

In FIG. 9, unusual waveform detection circuit 6 includes detecting unit 61 for producing an unusual waveform determination signal from an input digital playback signal and counting unit 12 (counting unit 32 or 42) for producing an unusual waveform detection signal from the input unusual waveform determination signal. Unusual waveform detection circuit 6 also detects whether or not an analog playback signal supplied from an optical disc has an unusual waveform.

Detecting unit 61 includes peak detecting circuit 511, comparator 111, delay circuit 112, exclusive OR circuit 213 as a coincidence circuit, and inverter 114. Detecting unit 61 compares a peak voltage from peak detecting circuit 511 with a preset threshold voltage, and determines whether or not the waveform is unusual. Comparator 111, delay circuit 112, exclusive OR circuit 213, and inverter 114 constitute a first determining unit of embodiment 6, and the first determining unit compares a peak voltage from peak detecting circuit 511 with the preset threshold voltage, and determines whether or not the waveform is unusual.

Detecting unit 61 differs from detecting unit 51 of FIG. 7 in that detecting unit 61 employs exclusive OR circuit 213 instead of adder 113 of detecting unit 51.

In this configuration, detecting unit 61 compares a peak voltage of a digital playback signal with the preset threshold voltage similarly to embodiment 5. Detecting unit 61 then outputs an unusual waveform determination signal when the same sign continues continuously, similarly to embodiment 2.

(Exemplary Embodiment 7)

Figure 10:
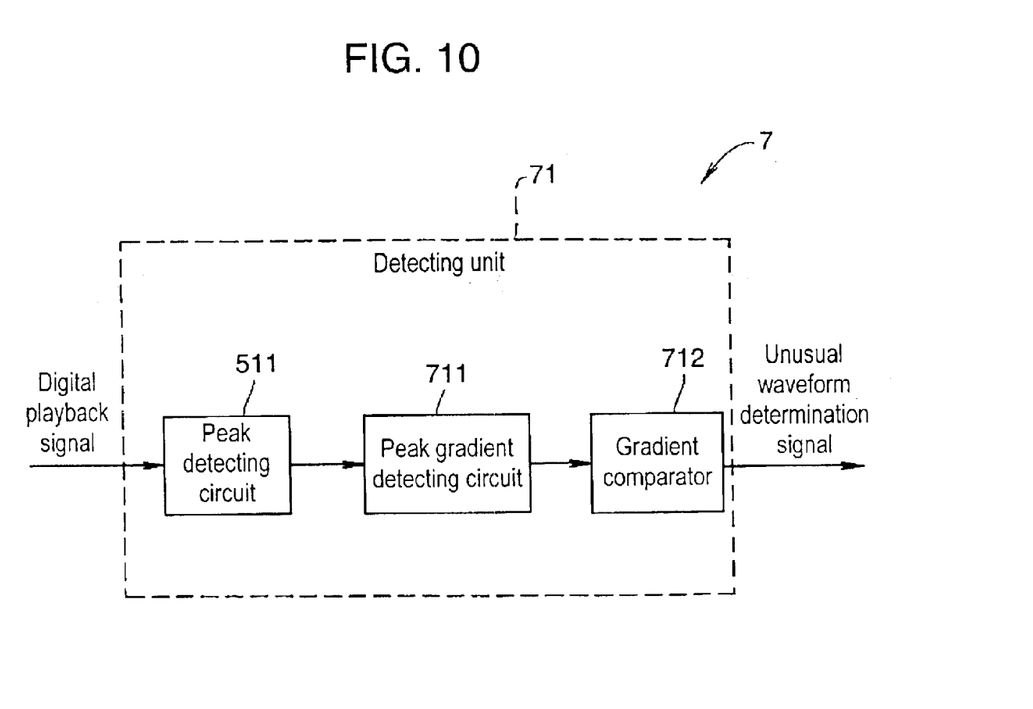
FIG. 10 is a block diagram showing an essential configuration of a detecting unit of an unusual waveform detection circuit in accordance with exemplary embodiment 7 of the present invention.

FIG. 10 is a block diagram showing an essential configuration of a detecting unit of an unusual waveform detection circuit in accordance with exemplary embodiment 7 of the present invention. In FIG. 10, elements similar to those in FIG. 7 are denoted with the same reference numbers, and the descriptions of those elements are omitted.

In FIG. 10, unusual waveform detection circuit 7 includes detecting unit 71 for producing an unusual waveform determination signal from an input digital playback signal and counting unit 12 (counting unit 32 or 42) for producing an unusual waveform detection signal from the input unusual waveform determination signal. Unusual waveform detection circuit 7 also detects whether or not an analog playback signal from an optical disc has an unusual waveform.

Detecting unit 71 comprises peak detecting circuit 511, peak gradient detecting circuit 711, and gradient comparator 712, monitors time transition of peak voltage from peak detecting circuit 511, detects peak voltage gradient based on the time transition of the peak voltage, and determines the unusual waveform when the detected peak voltage gradient exceeds a reference gradient.

Peak gradient detecting circuit 711 includes a peak voltage monitoring unit for monitoring the time transition of peak voltage from peak detecting circuit 511, and a peak gradient detecting unit for detecting a peak voltage gradient based on the time transition of the peak voltage calculated by the peak voltage monitoring unit.

Gradient comparator 712 includes a gradient comparing unit and a second determining unit. The gradient comparing unit compares the peak voltage gradient detected by the peak gradient detecting unit with a preset reference gradient. The second determining unit determines the unusual waveform when the peak voltage gradient exceeds the preset reference gradient in a comparing result by the gradient comparing unit, and outputs an unusual waveform determination signal.

In this configuration, as shown in FIG. 8, peak gradient detecting circuit 711 derives a difference based on the peak voltage calculated by peak detecting circuit 511 to determine a gradient (FIG. 8) of the continuous peak voltage, and outputs the gradient of the peak voltage.

Subsequent gradient comparator 712 then compares the peak gradient determined by peak gradient detecting circuit 711 with a preset gradient threshold, and outputs the unusual waveform determination signal only while the determined peak gradient exceeds the gradient threshold.

(Exemplary Embodiment 8)

Figure 11:
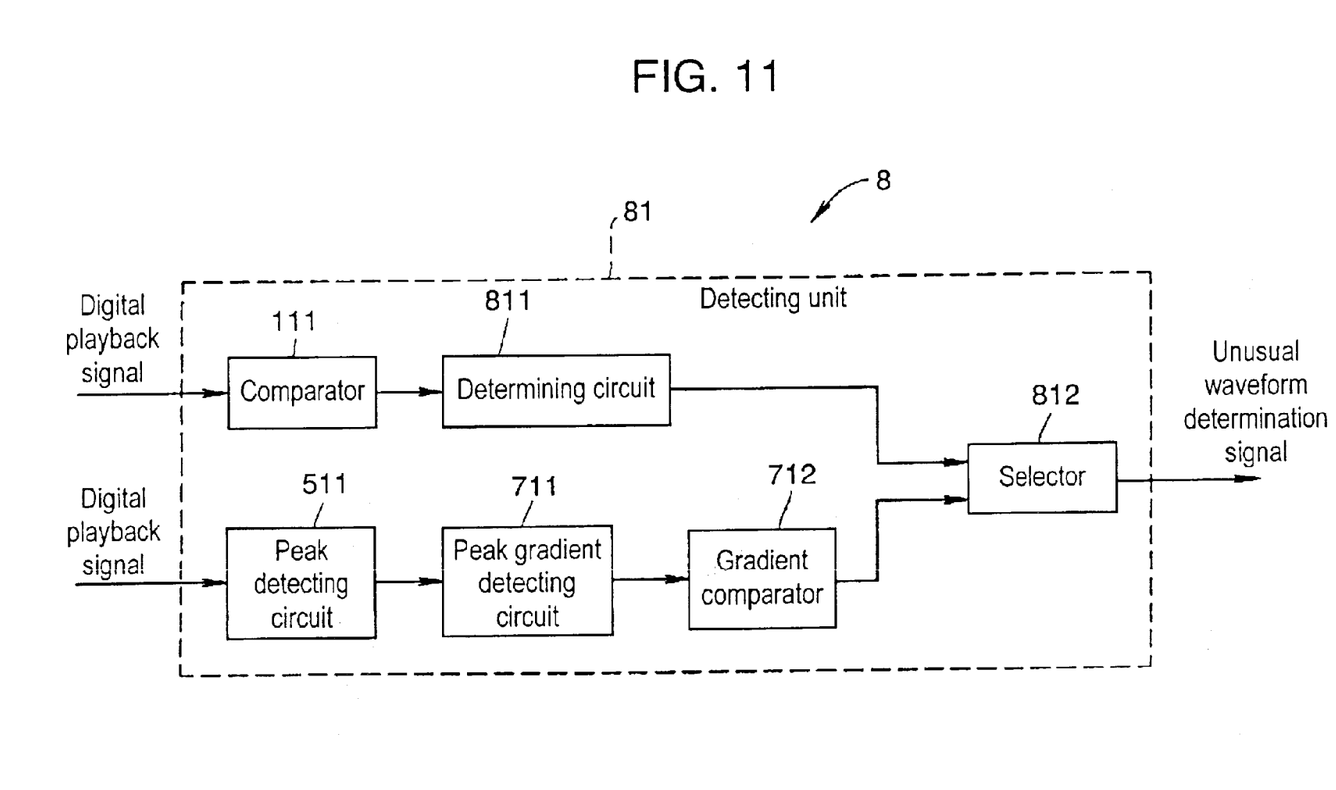
FIG. 11 is a block diagram showing an essential configuration of a detecting unit of an unusual waveform detection circuit in accordance with exemplary embodiment 8 of the present invention.

FIG. 11 is a block diagram showing an essential configuration of a detecting unit of an unusual waveform detection circuit in accordance with exemplary embodiment 8 of the present invention. In FIG. 11, elements similar to those in FIG. 2 (or FIG. 4) and FIG. 10 are denoted with the same reference numbers, and the descriptions of those elements are omitted.

In FIG. 11, unusual waveform detection circuit 8 includes detecting unit 81 for producing an unusual waveform determination signal from an input digital playback signal and counting unit 12 for producing an unusual waveform detection signal from the input unusual waveform determination signal. Unusual waveform detection circuit 8 also detects whether or not an analog playback signal from an optical disc has an unusual waveform.

Detecting unit 81 includes a first detecting unit having comparator 111 and determining circuit 811, a second detecting unit having peak detecting circuit 511, peak gradient detecting circuit 711, and gradient comparator 712, and selector 812 for selecting one of the first detecting unit and the second detecting unit depending on a type of unusual waveform having a complex pattern caused by various factors. Determining circuit 811 includes delay circuit 112, adder 113 (or exclusive OR circuit 213), and inverter 114.

In this configuration, a first unusual waveform detecting path and a second unusual waveform detecting path are prepared, and selector 812 can arbitrarily determine which detecting path is selected and perform the selection. Here, in the first unusual waveform detecting path, voltages at all sampling points are compared with a threshold and an unusual waveform determination signal is produced as described in embodiments 1 and 2. In the second unusual waveform detecting path, the gradient is calculated from the sampling points of only peak voltage information and an unusual waveform determination signal is produced as described in embodiment 7. Thus, unusual waveforms having a different pattern can be flexibly processed.

In each of the unusual waveform detection circuits of embodiments 1 to 8, as discussed above, a threshold used for determining the unusual waveform is arbitrarily set, and the unusual waveform detection circuit is digitized so that a voltage is compared with the threshold and an unusual waveform determination signal is produced. Therefore, the unusual waveform detection circuits are tough to a broadband analog playback signal and noise, can easily, and accurately detect an unusual waveform of a playback signal from an optical disc, and allows reduction of the circuit scale.

In producing a determination signal, a configuration where the comparison at all sampling points is performed and a configuration where a series of gradients of peak voltages of a signal waveform peak are calculated and compared with each other can be employed. Thus, various unusual waveforms can be detected.

When a digital-type unusual waveform detection circuit is used in an information playback apparatus such as an optical disc device, waveform unusualness of a playback signal due to a pit defect or the like can be prevented from subsequently causing the wrong operation of various signal processing circuits in the other digital block. In this case, the unusualness detection signal functions as a hold signal of the other digital block.

In each of the unusual waveform detection circuits of embodiments 1 to 8, the central value of the voltage of the analog playback signal may be used as the threshold, and the waveform may be determined to be unusual when voltage goes out of the threshold continuously at a plurality of times or more. The threshold does not need to be the central value of the voltage of the analog playback signal, of course. One threshold may be set on each of the upside and the downside of the central value of the voltage of the analog playback signal. In this case, the waveform may be determined to be unusual when voltage goes out of the threshold set on the upside of the central value continuously at a plurality of times or more or when voltage goes out of the threshold set on the downside of the central value continuously at a plurality of times or more.

In the same case (one threshold is set on each of the upside and the downside of the central value of the voltage of the analog playback signal), the waveform may be determined to be unusual when voltage exists continuously at a plurality of times or more between the threshold set on the upside of the central value and the threshold set on the downside thereof. This method is adequate for monitoring the peak voltage.

The unusual waveform detection circuit of the present invention is thus digitized, so that the detecting circuit is tough to a broadband analog playback signal and noise, can easily and accurately detect an unusual waveform signal, and allows simplification and scale reduction of the circuit.

An unusual waveform having a complex pattern caused by various factors can be easily and accurately detected by selecting an unusual waveform determining method.

When the unusual waveform detection circuit of the present invention is used in an information playback apparatus, waveform unusualness of a playback signal due to a pit defect or the like can be prevented from subsequently causing the wrong operation of various signal processing circuits in the other digital block.

What is claimed is:

1. A digital-type unusual waveform detection circuit for detecting an unusual waveform of an analog playback signal, said unusual waveform detection circuit comprising:

a digitizing unit for performing analog/digital conversion of the analog playback signal;

a detecting unit includes, a comparator for comparing output data of the digitizing unit corresponding to voltage of the playback signal with a preset threshold data corresponding to a threshold voltage at each sampling point of the playback signal, outputting sign data of the output data, a delay circuit for delaying the sign data by a predetermined time, and a logic circuit for outputting a first sign data when both output signals from the comparator and the delay circuit have the same sign, outputting a second sign data when the sign of output signal from the comparator differs from the sign of output signal from the delay circuit; and a counting unit for counting the period during which the first data outputs and outputting an unusualness detection signal when the count value exceeds a predetermined threshold.

2. An unusual waveform detection circuit according to claim 1, wherein said counting unit counts the determination signal synchronously with a clock signal.

3. An unusual waveform detection circuit according to claim 2, wherein the clock signal is one of a system clock signal and a frequency divided clock signal arbitrarily divided from the system clock signal.

4. An unusual waveform detection circuit according to claim 1, wherein the logic circuit is one of an adder and a coincidence circuit.

5. A digital-type unusual waveform detection circuit for detecting an unusual waveform of an analog playback signal, said unusual waveform detection circuit comprising:
   a digitizing unit for performing analog/digital conversion of the analog playback signal;
   a detecting unit for determining whether an input signal from said digitizing unit satisfies a preset input waveform condition and for outputting a determination signal; and
   a counting unit for counting the output from said detecting unit and outputting an unusualness detection signal when the count value exceeds a predetermined threshold;
   wherein said detecting unit includes,
   a peak detecting unit for detecting a waveform peak of the input signal and outputting a voltage of the waveform peak;
   a peak voltage monitoring unit for monitoring time transition of the peak voltage from the peak detecting circuit;
   a peak gradient detecting unit for detecting a peak voltage gradient based on the time transition of the peak voltage calculated by the peak voltage monitoring unit;
   a gradient comparing unit for comparing the peak voltage gradient with a preset reference gradient; and
   a second determining unit for outputting an unusual waveform determination signal based on a comparing result from the gradient comparing unit.

6. A digital-type unusual waveform detection circuit for detecting an unusual waveform of an analog playback signal, said unusual waveform detection circuit comprising:
   a digitizing unit for performing analog/digital conversion of the analog playback signal;
   a detecting unit for determining whether an input signal from said digitizing unit satisfies a preset input waveform condition and for outputting a determination signal; and
   a counting unit for counting the output from said detecting unit and outputting an unusualness detection signal when the count value exceeds a predetermined threshold;
   wherein said detecting unit includes,
   a first detecting unit including:
   a comparator for outputting, as sign data, a comparing result of a voltage at each sampling point of the playback signal with a preset threshold voltage;
   a delay circuit for delaying the sign data by a predetermined time and outputting the sign data;
   a logic circuit for outputting predetermined sign data when both output signals from the comparator and the delay circuit have the same sign; and
   an inverter for logically inverting a logical output from the logic circuit and outputting the inverted logical output; and
   a second detecting unit including:
   a peak detecting unit for detecting a waveform peak of the input signal and outputting a voltage of the waveform peak;
   a peak voltage monitoring unit for monitoring time transition of the peak voltage from the peak detecting circuit;
   a peak gradient detecting unit for detecting a peak voltage gradient based on the time transition of the peak voltage calculated by the peak voltage monitoring unit;
   a gradient comparing unit for comparing the peak voltage gradient with a preset reference gradient; and
   a second determining unit for outputting an unusual waveform determination signal based on a comparing result from the gradient comparing unit; and
   selecting unit for selecting one of the first detecting unit and the second detecting unit.

7. A digital-type unusual waveform detection circuit for detecting an unusual waveform of an analog playback signal, said unusual waveform detection circuit comprising:
   a digitizing unit for performing analog/digital conversion of the analog playback signal;
   a detecting unit for determining whether an input signal from said digitizing unit satisfies a preset input waveform condition and for outputting a determination signal; and
   a counting unit for counting the output from said detecting unit and outputting an unusualness detection signal when the count value exceeds a predetermined threshold;
   wherein said detecting unit includes,
   a first detecting unit including:
   a comparator for outputting, as sign data, a comparing result of a voltage at each sampling point of the playback signal with a preset threshold voltage;
   a delay circuit for delaying the sign data by a predetermined time and outputting the sign data;
   a logic circuit for outputting predetermined sign data when both output signals from the comparator and the delay circuit have the same sign; and
   an inverter for logically inverting a logical output from the logic circuit and outputting the inverted logical output; and
   a second detecting unit including:
   a peak detecting unit for detecting a waveform peak of the input signal and outputting a voltage of the waveform peak; and
   a second determining unit for comparing the peak voltage from the peak detecting unit with the preset threshold voltage and determining whether waveform is unusual; and
   a selecting unit for selecting one of the first detecting unit and the second detecting unit.

8. An information playback apparatus for detecting an unusual waveform of an analog playback signal read out of a recording medium using an digital-type unusual waveform detection circuit, said information playback apparatus comprising:
   a digitizing unit for performing analog/digital conversion of the analog playback signal;
   a detecting unit including,
   a comparator for comparing output data of the digitizing unit corresponding to voltage of the playback signal with a preset threshold data corresponding to a threshold voltage at each sampling point of the playback signal, outputting sign data of the output data, a delay circuit for delaying the sign data by a predetermined time, and a logic circuit for outputting a first sign data when both output signals from the comparator and the delay circuit have the same sign, outputting a second sign data when the sign of output signal from the comparator differs from the sign of output signal from the delay circuit; and a counting unit for counting the period during which the first data outputs and outputting an unusualness detection signal when the count value exceeds a predetermined threshold

9. An information playback apparatus according to claim 8, wherein the unusualness detection signal functions as a hold signal of another digital block.

10. A digital-type unusual waveform detection circuit for detecting an unusual waveform of an analog playback signal, said unusual waveform detection circuit comprising:

a digitizing unit for performing analog/digital conversion of the analog playback signal;

a detecting unit including a first detecting unit and a second detecting unit for determining whether an input signal from said digitizing unit satisfies a preset input waveform condition and for outputting a determination signal;

a selecting unit for selecting one of the first detecting unit and the second detecting unit; and a counting unit for counting the output from said selecting unit and outputting an unusualness detection signal when the count value exceeds a predetermined threshold;

wherein the first detecting unit includes, a comparator for outputting as sign data, a comparing result of a voltage at each sampling point of the playback signal with a preset threshold voltage, a delay circuit for delaying the sign data by a predetermined time and outputting the sign data, selecting unit for selecting one of the first detecting unit and the second detecting unit; and a logic circuit for outputting predetermined sign data when both output signals from the comparator and the delay circuit have the same sign, wherein the second detecting unit includes, a peak detecting unit for detecting a peak value of the input signal, a peak value monitoring unit for monitoring the time transition of the peak value, a peak gradient detecting unit for detecting a peak value gradient based on the time transition of the peak value calculated by the peak voltage monitoring unit, a gradient comparator for comparing the peak gradient determined by peak gradient detecting unit with a preset gradient threshold, and a determining unit for outputting an unusual waveform determination signal when the peak voltage gradient exceeds the preset gradient threshold.

11. A digital-type unusual waveform detection circuit for detecting an unusual waveform of an analog playback signal, said unusual waveform detection circuit comprising:

a digitizing unit for performing analog/digital conversion of the analog playback signal;

a detecting unit including a first detecting unit and a second detecting unit for determining whether an input signal from said digitizing unit satisfies a preset input waveform condition and for outputting a determination signal;

a selecting unit for selecting one of the first detecting unit and the second detecting unit; and a counting unit for counting the output from said selecting unit and outputting an unusualness detection signal when the count value exceeds a predetermined threshold;

wherein the first detecting unit includes, a comparator for outputting, as sign data, a comparing result of a voltage at each sampling point of the playback signal with a preset threshold voltage, a delay circuit for delaying the sign data by a predetermined time and outputting the sign data, and a logic circuit for outputting predetermined sign data when both output signals from the comparator and the delay circuit have the same sign, and wherein the second detecting unit includes, a peak detecting unit for detecting a peak value of the input signal, a determining unit for comparing the peak value from the peak detecting unit with the preset threshold voltage and determining whether waveform is unusual.

12. An unusual waveform detection circuit according to claim 1, wherein the threshold voltage is a center value of voltage of the analog playback signal.

* * * * *